United States Patent [19]

Stingel, Jr. et al.

[11] Patent Number: 5,285,928
[45] Date of Patent: * Feb. 15, 1994

[54] FLUID-OPERATED CONTAINER STORAGE AND DISPENSING SYSTEM

[75] Inventors: Frederick J. Stingel, Jr., 872 Lakeside Dr., North Palm Beach, Fla. 33408; Frederick J. Stingel, III, Palm Beach Gardens, Fla.

[73] Assignee: Frederick J. Stingel, Jr., Lexington, Ky.

[ * ] Notice: The portion of the term of this patent subsequent to Aug. 17, 2010 has been disclaimed.

[21] Appl. No.: 882,145

[22] Filed: May 12, 1992

Related U.S. Application Data

[63] Continuation-in-part of Ser. No. 878,709, May 1, 1992, Pat. No. 5,236,104.

[51] Int. Cl.$^5$ .................... G07F 11/06; G07F 11/08
[52] U.S. Cl. ................................. 221/75; 221/108; 193/27; 414/276; 312/42
[58] Field of Search .................. 221/75, 22, 311, 204, 221/205, 107, 108, 109; 193/27, 28, 35 R, 38, 40; 414/267, 276, 285; 312/42

[56] References Cited

U.S. PATENT DOCUMENTS

| | | |
|---|---|---|
| 296,600 | 4/1884 | Norwood . |
| 342,433 | 5/1886 | Fischer . |
| 409,806 | 8/1889 | Schureman . |
| 1,034,618 | 8/1912 | Holcombe . |
| 2,701,077 | 2/1955 | Palmer . |
| 3,437,235 | 4/1969 | Guerra . |
| 3,477,560 | 11/1969 | Broser . |
| 3,608,776 | 9/1971 | Moe et al. . |
| 4,273,253 | 6/1981 | Tanaka et al. . |
| 4,485,910 | 12/1984 | Tabler . |
| 4,621,745 | 11/1986 | Grace . |
| 5,111,963 | 5/1992 | Grace . |

FOREIGN PATENT DOCUMENTS

| | | |
|---|---|---|
| 453068 | 11/1927 | Fed. Rep. of Germany . |
| 1045134 | 11/1958 | Fed. Rep. of Germany . |
| 1144186 | 2/1963 | Fed. Rep. of Germany . |
| 52-1862 | 1/1977 | Japan . |
| 54-38075 | 3/1979 | Japan . |
| 521191 | 9/1976 | U.S.S.R. . |
| 1044183 | 9/1966 | United Kingdom . |
| 1414022 | 11/1975 | United Kingdom . |
| 2047666 | 12/1980 | United Kingdom . |

OTHER PUBLICATIONS

Allan Harvey, "Automatic Routing and Dispatching to Trucks and Trailers," Flow Magazine, May 1956, pp. 110 and 142.

Ordermatic Bulletin No. 376 "A Guide to Automated Order Selection System".

Autoque Brochure–Cybernated Automation Corporation.

Primary Examiner—Robert P. Olszewski
Assistant Examiner—Dean A. Reichard
Attorney, Agent, or Firm—Quarles & Brady

[57] ABSTRACT

A system for storing and dispensing articles, containers and the like includes stacks of opposing, vertically staggered shelf assemblies. A shelf associated with each shelf assembly is pivotally mounted for movement at least between an upwardly tilted receiving position and a downwardly tilted discharge position. A fluid-operating system is disclosed for maintaining each shelf in its upwardly tilted receiving position until a container is received and to prevent the lowering of the shelf to the discharge position until the next lower shelf is prepared to receive a container.

9 Claims, 5 Drawing Sheets

FLUID-OPERATED CONTAINER STORAGE AND DISPENSING SYSTEM

CROSS-REFERENCE TO RELATED APPLICATION

This is a continuation-in-part of Applicant's co-pending U.S. Pat. Application Ser. No. 07/878,709, filed May 1, 1992 now U.S. Pat. No. 5,236,104, the disclosure of which is incorporated by reference herein.

BACKGROUND OF THE INVENTION

1. Field of the Invention

The invention relates to automated storage and dispensing systems for containers, articles and the like. More particularly, the invention relates to systems for storing containers and automatically advancing the containers in the storing apparatus as a container is dispensed from the apparatus.

2. Description of the Relevant Art

Vertically accumulating container storage and retrieval apparatus is shown by Grace, U.S. Pat. No. 4,621,745. This construction consists of opposing stacks of vertically staggered shelves which are pivotable between an upwardly tilted, receiving position, a storage position, and a downwardly tilted, discharge position. Movement of the shelves is controlled such that an upper shelf cannot pivot downwardly to the discharge position unless the next lower shelf is in the upwardly tilted, receiving position. Containers travel down the stack of opposing shelves in zig-zag fashion to come to rest at the lowest unoccupied shelf. Grace, U.S. Pat. No. 5,11,963, discloses a two-position shelf assembly which increases efficiency in some applications. The disclosures of U.S. Pat. No. 4,621,745 and U.S. Pat. No. 5,111,963 are incorporated herein by reference.

There is a continuing need for improved container storage and retrieval apparatus which are adaptable to special situations such as light product weight, variable product weight and heavy product weight. Prior apparatus may not work properly with very light weight containers, which do not have sufficient weight or momentum for mechanical actuation to function properly. Also, very heavy loads may cause jarring, vibration, excessive wear and improper operation.

During operation, a transferred container can topple or lodge between shelf assemblies if the receiving shelf assembly is not prevented from pivoting downwardly from the receiving position before the container is completely disposed on the receiving shelf surface. Accordingly, the descent of the receiving shelf assembly should be delayed until the container is fully received.

SUMMARY OF THE INVENTION

It is an object of the invention to provide an improved container storage and dispensing system.

It is another object of the invention to provide an improved automated container storage and dispensing system.

It is still another object of the invention to reduce wear of the components of an automated container storage and dispensing system.

It is yet another object of the invention to prevent premature downward movement of a shelf assembly in an automated container storage and dispensing system.

It is a further object of the invention to provide an automated container storage and dispensing system which can operate substantially independently of the container weight.

These and other objects of the invention are achieved by a storage and dispensing system for articles, containers and the like. The system generally has two opposing, substantially vertical stacks of shelf assemblies mounted on support structure, such as walls, columns or a free-standing tower. Each shelf assembly includes a shelf for receiving, storing and discharging containers, and the shelves of the opposing stacks are vertically staggered relative to one another.

Each shelf is pivotally mounted relative to the support structure for rotation at least between an upwardly tilted receiving position and a downwardly tilted discharge position. The free ends of the shelves of each stack extend toward the free ends of the shelves of the opposing stack. A shelf in the downwardly tilted discharge position is positioned relative to a next lower, opposing shelf in the upwardly tilted receiving position to permit the sliding transfer of a container from the upper shelf to the next lower, opposing shelf.

Containers are introduced to the shelf assemblies at or near the top of the stacks and are transferred downwardly from one shelf to the next in zigzag manner. Each container descends through the stacks until it is disposed on the lowest unfilled shelf. Containers are selectively dispensed from a dispensing position at the bottom of the stacks.

Each shelf assembly includes fluid-operated structure for raising the shelf to the receiving position. The raising structure is preferably embodied in a liquid or gas cylinder, although other structure known in the art could also be suitable. The raising structure can be used to lower the shelf by positive pressure or by a reduction in the fluid pressure used to raise the shelf. The raising structure is preferably an air cylinder, and most preferably is a double acting air cylinder. The raising and lowering of the double acting air cylinder can be controlled by a cylinder control valve which selectively supplies control pressure to the top or bottom sides of an air cylinder piston.

Each shelf assembly includes container indicator structure. The container indicator structure provides a raising signal to the fluid-operated raising structure to raise the shelf when it is empty, and to lower the shelf when it has a container.

Each shelf assembly also includes transfer control structure for maintaining the shelf in the receiving position, or an intermediate storage position, when the next lower opposing shelf is occupied by a container. The transfer control structure can be a fluid line which transfers a signal from the container indicator valve of the next lower shelf assembly to control the raising cylinder of the upper shelf assembly. In a most preferred embodiment, the transfer control structure includes a transfer valve in the fluid line between the container indicator valve and cylinder of the upper shelf assembly. Preferably, the signal from the container indicator valve of the next lower shelf assembly is utilized to actuate the transfer valve of the upper shelf assembly to permit a lowering signal to reach the raising cylinder of the upper shelf only when the next lower shelf does not have a container.

The shelf assembly can also include receiving control structure for retaining a shelf in the receiving position until a container transferred from the next higher shelf assembly is fully received by the shelf. The receiving control prevents the shelf from descending prematurely, which can cause the container to topple or lodge between shelves. The receiving control can be a valve positioned in the fluid line between the container indicator valve of the next lower shelf assembly and the transfer valve of the upper shelf assembly. The valve is actuated mechanically or otherwise by the position of the shelf to permit a lowering signal to reach the transfer valve of the upper shelf assembly only when the shelf of the next lower shelf assembly is fully in the upwardly tilted, receiving position.

When both the transfer control structure and the receiving control structure are provided in the shelf assembly, the shelf is retained in the receiving or storage position until the receiving control structure and the transfer control structure are simultaneously configured to allow the shelf to pivot downwardly. If either the receiving control structure or the transfer control structure are not correctly oriented, the shelf cannot descend to the discharge position. Thus, the invention will prevent premature descent of the shelf before a container is fully received and will also prevent the transfer of a container to a next lower shelf that is already occupied by a container or is not in the receiving position.

The storage and dispensing system of the invention utilizes shelf assemblies pivoting at least between an upwardly tilted receiving and storage position and a downwardly tilted discharge position. The number of operational steps required to receive, store and dispense a container are thereby reduced. The two position shelf assembly can improve the smoothness of motion, and can thereby reduce wear of the component parts of the assembly and damage to goods being transferred through the apparatus. If desired, suitable fluid control structure can be installed to provide one or more intermediate positions. In one such embodiment, fluid controls would lower the shelf with a container to a horizontal, storage position until such time as a discharge signal is received. Other intermediate positions could be provided if such are necessary.

BRIEF DESCRIPTION OF THE DRAWINGS

The accompanying drawings depict embodiments which are presently preferred, but it should be understood that the invention is not limited to these preferred arrangements and instrumentalities, wherein.

DETAILED DESCRIPTION OF THE PREFERRED EMBODIMENTS

Figure 1:
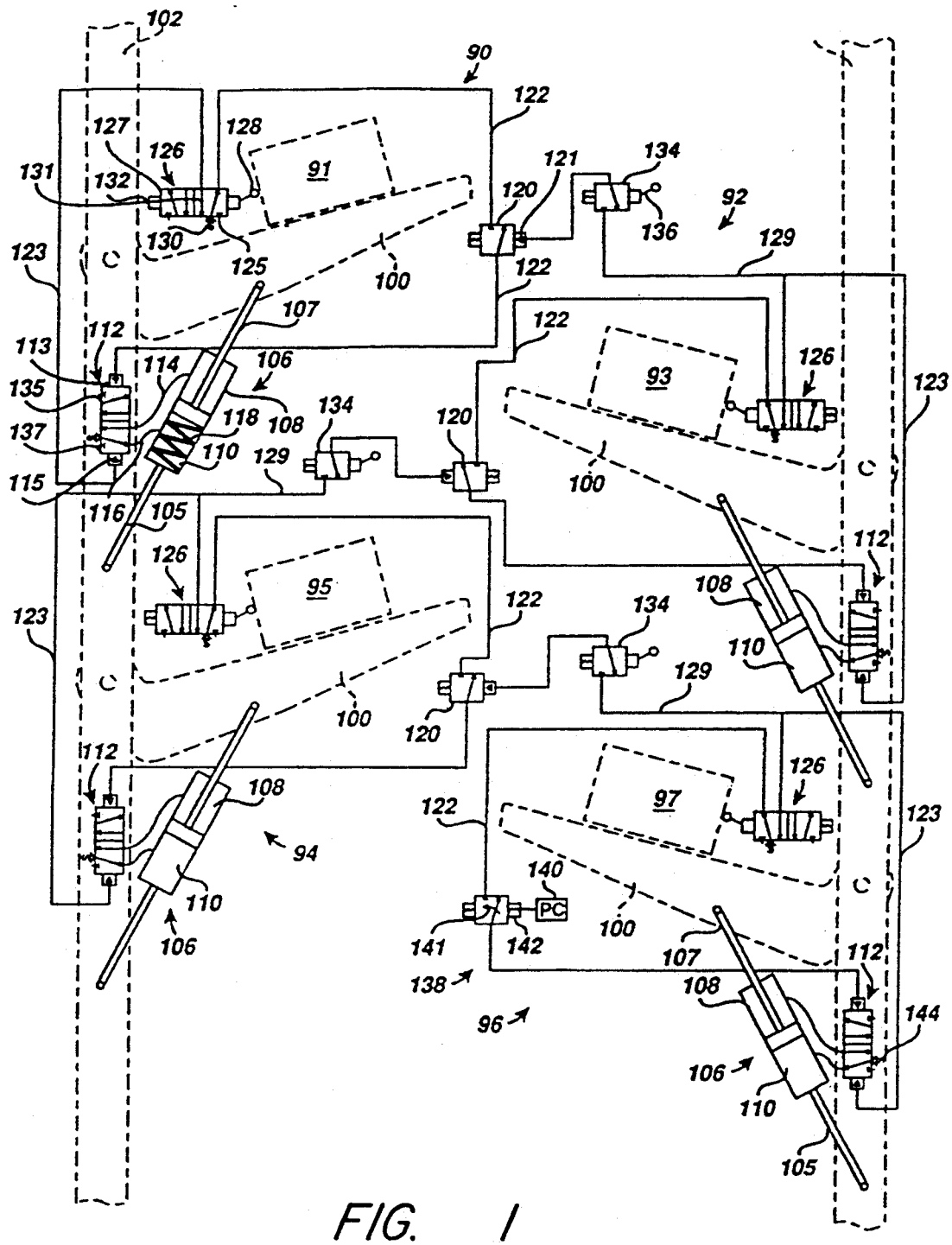
FIG. 1 is a schematic representation of a pneumatic control system superimposed on a schematic phantom, side elevation view of the invention, and depicting a first mode of operation.

The invention relates to systems for vertically storing and dispensing containers, cartons, articles or the like. The apparatus can have many applications, and the preferred embodiments disclosed herein can be adapted to accommodate containers and articles having a wide range of weights, sizes and shapes.

Referring to the drawings, the container storage and dispensing system generally includes two opposing, substantially vertical stacks of staggered shelf assemblies 90, 92, 94 and 96 mounted on support structure. The stacks can consist of any number of shelf assemblies, but the shelf assemblies 90, 92, 94 and 96 are shown in the drawings for purposes of explanation and illustration. The support structure can be walls or the like, but is preferably a framework, such as a free standing tower, which has substantially vertical columns 102 and 104. The columns can be laterally supported by cross members.

Figure 4:
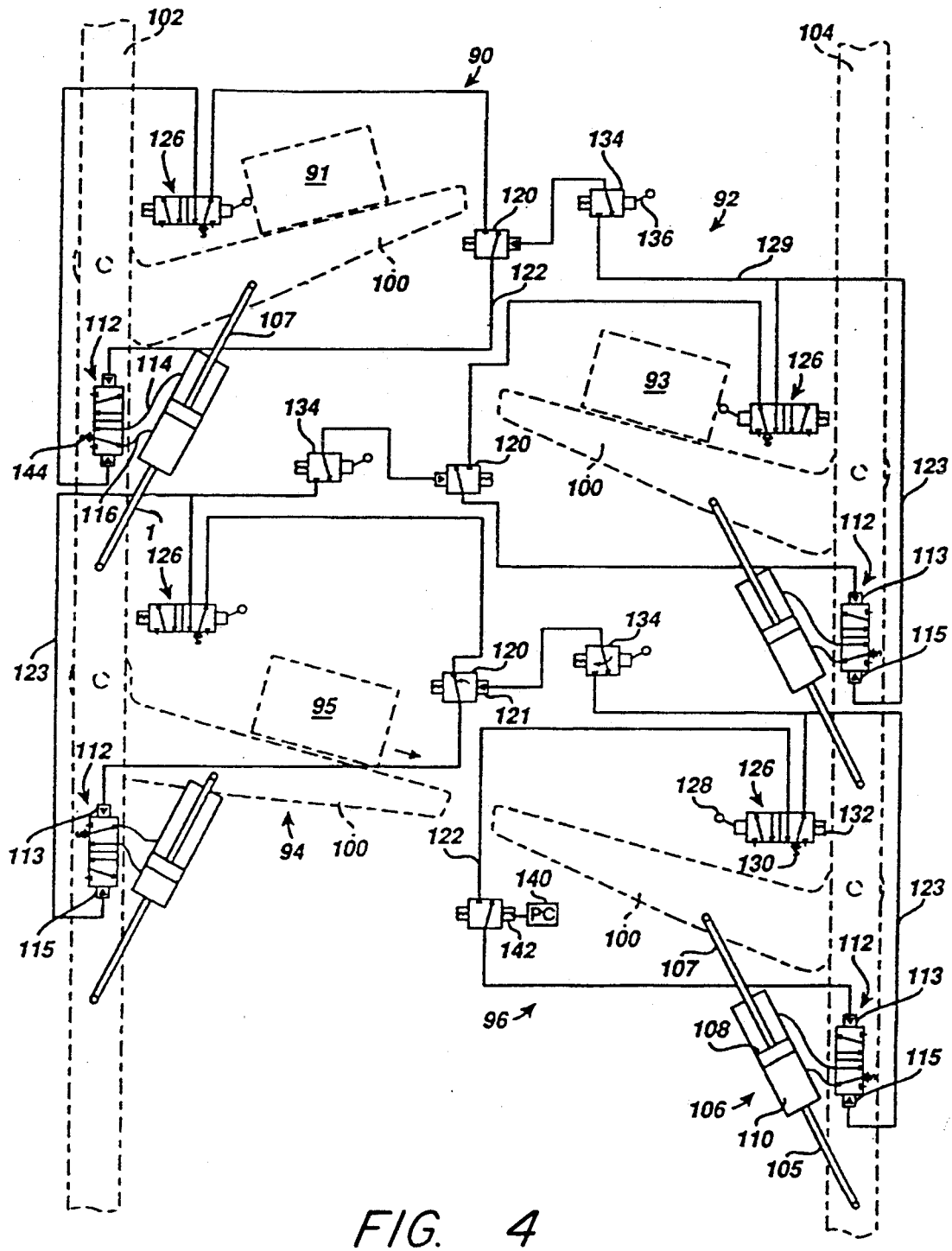
FIG. 4 is a representation similar to FIG. 3, and depicting a fourth mode of operation.
Figure 5:
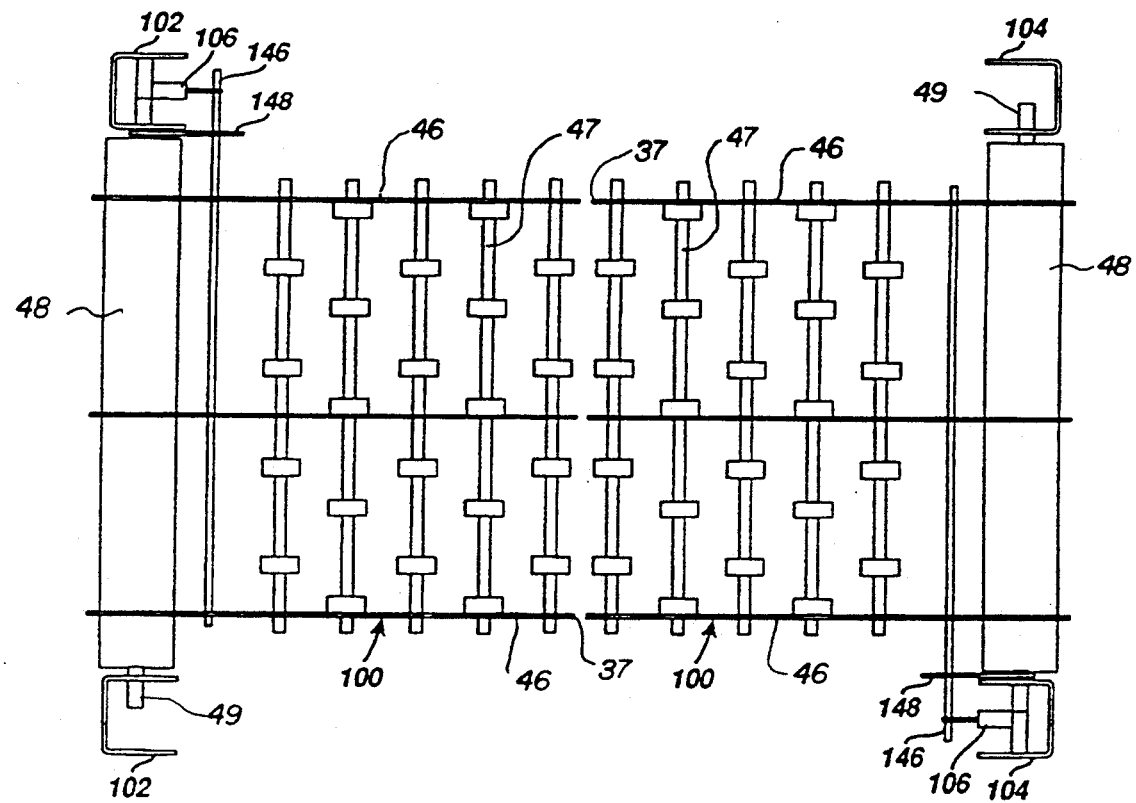
FIG. 5 is a top plan view.

Each shelf assembly includes a shelf 100 for receiving, storing and discharging containers. Each shelf 100 is pivotally mounted relative to the support structure for movement at least between an upwardly tilted receiving position, illustrated by the shelf assembly 96, and a downwardly tilted discharge position, illustrated by the shelf assembly 94 (FIG. 4). One or more intermediate storage positions are also possible. The free ends of the shelves of each stack extend toward the free ends of the opposing stack (FIG. 5). As illustrated in FIG. 4, the forward end of a shelf assembly 94 in the downwardly tilted discharge position preferably aligns with the free end of a next lower, opposing shelf 96 in the upwardly tilted receiving position to allow for the smooth transfer of a container 95 from the upper shelf to the next lower, opposing shelf.

Containers are introduced to the apparatus at or near the top of the stacks. A biased ramp can be provided to receive containers at the top of the apparatus and pivot under the weight of containers to transfer the containers to the first, uppermost shelf assembly 90. The containers are transferred sequentially downward in a zig-zag manner through the stacks, from one shelf to the next lower shelf, and each container descends through the stacks until it is disposed on the lowest unfilled shelf. The system can include a fixed, upwardly tilted dispensing ramp to dispense containers discharged from the lowest shelf assembly 96 to external structure, such as a conveyor belt.

The shelf assemblies 90, 92, 94 and 96 illustrate various modes of operation of the preferred shelf assembly and the associated position of the shelf assembly components. Accordingly, reference to particular shelf assemblies are made in connection with the particular mode of operation being discussed.

Each shelf 100 is pivotally attached to the vertical support structure, such as between the columns 102 and 104, for movement at least between an upwardly tilted receiving position, as shown, and a downwardly tilted discharge position. A raising means such as a pneumatic air cylinder is provided for driving the shelf 100 to the receiving position when the shelf is empty, but allowing descent when a container is present on the shelf 100. The receiving position can also serve as a storing position for a container, as illustrated in FIG. 1. The container will occupy a shelf until the next lower shelf assembly is prepared to receive the container. The tilt angles of the receiving and discharge positions relative to horizontal can be varied, but preferably are between 5 and 20 degrees. One or more intermediate storage positions, preferably at or near the horizontal, are also possible.

The shelf 100 can be formed in various designs. A currently preferred design includes two or three shelf arms 46, which extend in parallel from the support structure to the free end 37 of the shelf 100 (FIG. 5). Cross members 47 are mounted between and transversely to the shelf arms 46, and can have a plurality of rollers 51 to assist movement of containers across the surface of the shelf 100. The shelf arms 46 can be attached to a mounting bar 48, which is pivotally mounted between the columns 102 and 104. The mounting bar 48 can include pins 49 which extend into aligned holes in the columns 102 and 104, thereby allowing the shelf 100 to pivot vertically relative to the support structure.

Each shelf assembly includes transfer control structure which prevents lowering of the shelf 100 to the discharge position when a container is disposed on the next lower, opposing shelf, or when that shelf is not in the receiving position. When the next lower shelf assembly is prepared to receive a container, i.e. is empty and is in the receiving position, the transfer control structure allows the upper shelf to pivot downwardly to discharge the container.

The shelf assembly also provides a container indicator for maintaining the shelf 100 in the receiving position until a container being transferred from a next higher shelf assembly is completely disposed on the shelf surface. The container indicator prevents the shelf 100 from descending prematurely, which can cause the transferred container to topple or lodge between shelf assemblies.

The invention utilizes fluid-operated control components, which have been found to be particularly desirable for light-weight containers and packages. In addition to light-weight applications, the fluid-controlled system may be appropriate for heavy-weight applications, perhaps of 100 pounds or more.

A preferred fluid-controlled embodiment of the invention can include double acting fluid cylinders that are controlled to raise and lower the shelves. Air is a preferable fluid, although other gases or liquids such as oil could alternatively be utilized. The lowering of the shelves can be accomplished by suitable connections to a lowering cylinder or to the lowering side of a double-acting cylinder, or by the exhaust of pressure to a raising cylinder.

The shelves, support structure and containers are represented schematically and in phantom in FIGS. 1–5, it being understood that the details of these components can be constructed according to known engineering principles. The array of valves and air lines in the control system of the preferred pneumatic embodiment is illustrated schematically to more clearly show the operation of the fluid-operated control system relative to the operation of the shelves. The various valves can be mounted to the support structure and shelves in any fashion that is suitable to permit actuation according to the position of the shelves and the associated containers in the manner to be described. The valves are depicted in conventional pneumatic logic symbology, with adjacent boxes schematically representing the alternate operational configurations of the valves. It should be appreciated, however, that alternative logic designs and control configurations can be designed, and the invention is not intended to be limited to that disclosed herein.

The valves can be selected from several conventional pneumatic valve constructions, such as four-way spool valves, and can be actuated by cam rollers, air pilots, return springs, solenoids and other suitable actuators.

The shelf raising means is preferably a pneumatic cylinder, such as the double acting air cylinder 106. The shelf raising means provides for movement of the shelf 100 at least between an upwardly tilted receiving position, as shown by the shelf assembly 96 in FIG. 3, and a downwardly tilted discharge position, shown by the shelf assembly 94 in FIG. 4. The air cylinder 106 can be attached between the shelf 100 and the support structure by suitable structure such as a strut 105 and a piston arm 107. The air cylinder 106 can include an upper chamber 108 and a lower chamber 110 that are pneumatically connected to a cylinder control valve 112 through lines 114 and 116, respectively. The cylinder control valve 112, which can be a four-way, double air pilot spool valve, can be configured to selectively provide supply pressure to either the upper chamber 108 or to the lower chamber 110, while exhausting the non-supplied chamber.

When placed in the raising configuration, the cylinder control valve 112 ports supply pressure to the lower chamber 110 through the air line 116. Simultaneously, the upper chamber 108 is exhausted through the line 114. The cylinder control valve 112 can alternatively be placed in a lowering configuration, as shown by the shelf assembly 96 in FIG. 2, wherein pressure is provided to the upper chamber 108 through the line 114 and the lower chamber 110 is exhausted through the line 116. The relative rates of pressurization and exhaust of the opposing chambers 108 and 110 can be regulated to insure smooth raising and lowering of each shelf 100.

In the event of an air supply failure, the air pressure in the air cylinder may be discharged, causing raised shelves to lower prematurely. Accordingly, the air cylinder 106 can be equipped with a return spring 118 (FIG. 1) for maintaining the shelf 100 in the raised position in the absence of air pressure.

The positioning of a shelf 100 between the upwardly tilted receiving position and downwardly tilted discharge position, and the movement of the cylinder control valve 112 between the raising configuration and the lowering configuration, are preferably dependent upon two factors. First, an upwardly tilted shelf should remain in that position so long as the shelf does not have a container, so as to be in a position to receive a container. Second, a shelf should remain upwardly tilted or in an intermediate storage position so long as the next lower shelf assembly is not prepared to receive a container. A shelf can be adapted to move to an intermediate storage position if it has a container and the next lower shelf is unprepared to receive a container.

The pneumatic control system is constructed so as to maintain the cylinder control valve 112 in the raising configuration if the shelf 100 is empty, or in the raising configuration or an intermediate storage configuration if the next lower shelf assembly has a container or is not prepared to receive a container. The container indicator structure preferably includes a container indicator valve 126 to detect the presence of a container on each shelf 100. The container indicator valve 126, which is shown in pneumatic logic symbology, can be a four-way spool valve, and includes a first configuration illustrated within the box 125 of shelf assembly 90 in FIG. 1. The box 125 represents the porting of a supply source 130 to a line 122, and the porting of an exhaust outlet 131 to a line 123. A second configuration, illustrated by the box 127, represents the porting of the supply source 130 to the line 123, and the porting of the exhaust 131 to the line 122.

The valve 126 is operated by an actuator which responds to the presence or absence of a container on the shelf. For example, a mechanical actuator such as a cam roller 128 can be provided, which will be depressed by a container 91 that is transferred onto the shelf 100.

When the container 91 is present on the shelf 100, the indicator valve 126 is oriented to the position represented within box 125, in which flow from the supply source 130 is routed as a lowering signal through the air line 122 to the gate 113 of cylinder control valve 112, while the line 123 is exhausted. The cylinder control valve 112 will therefore be moved from the raising configuration shown within box 137 to the lowering configuration shown with box 135. This will port air to the upper chamber 108 of the air cylinder 106 to lower the shelf 100. A return spring 132 can be utilized to position the valve 126 in the second configuration 127 when a container is removed from the shelf 100, as illustrated by the shelf assembly 96 in FIG. 3. In this orientation, the line 122 is exhausted and a raising signal is routed through the line 123 to the gate 115. The cylinder control valve 112 will be placed in the raising configuration to raise the shelf 100. Other valving and control configurations are also possible.

The pneumatic system preferably also includes transfer control structure operatively connecting the shelf assembly with the next lower shelf assembly. The transfer control structure of a shelf assembly, for example of the shelf assembly 90, applies the condition of the next lower shelf assembly to the positioning of the shelf 100 of the upper shelf assembly 90, so that the shelf assembly 90 will not be lowered to the discharge position unless the next lower shelf assembly 92 is prepared to receive a container.

The transfer control structure most preferably includes a normally open three-way transfer valve 120 for controlling the passage of a lowering signal through the line 122 to the cylinder control valve 112, according to whether the next lower shelf assembly is presently storing a container. In a presently preferred embodiment, the transfer valve 120 in either the open or closed condition is controlled by the configuration of the container indicator valve 126 of the next lower shelf assembly. An air line 129 taken, for example, from the air line 123 can be utilized to apply a transfer signal to the gate 121 when the container indicator valve 126 is in the raising configuration. The presence of the transfer signal at the gate 121 is operable to close the transfer valve 120 to permit the lowering signal of the container indicator valve 126 of the shelf assembly 90 to pass to the cylinder control valve 112, which will effect lowering of the shelf 100 and transfer of the container.

The open condition of the transfer valve 120 occurs when the next lower shelf assembly is unprepared to receive a container, in which case the transfer signal is not generated through the line 129. The open condition of the transfer valve 120 prevents the lowering signal of the container indicator valve 126 from reaching and actuating the cylinder control valve 112 of the upper shelf assembly. When the next lower shelf assembly has discharged a container and is prepared to a receive another container, the container indicator valve 126 of that shelf assembly changes configuration and a transfer signal is generated through the line 129 to close the transfer stop valve 120 again. This permits the lowering signal to pass through the line 122 to the cylinder control valve 112 to initiate the lowering of the shelf 100 of the upper shelf assembly if that shelf assembly has a container.

The container indicator valve 126 of the next lower shelf assembly can possibly forward a transfer signal to the upper shelf assembly before the next lower shelf assembly is in the fully upright position, ready to receive a container. This can cause mishaps during the container transferring process. The transfer control structure therefore preferably also includes a receiving position indicator valve 134 which prevents the passage of the transfer signal to the transfer valve 120 until the shelf 100 of the next lower shelf assembly is fully disposed in the receiving position. The receiving position indicator valve 134 can be a normally open three-way valve connected to the support structure and equipped with a mechanical actuator 136 or other structure for contacting or otherwise sensing the position of the shelf 100 of the next lower shelf assembly. The mechanical actuator 136 closes the receiving position indicator valve 134 when the shelf 100 of the next lower shelf assembly is fully in the upwardly tilted, container receiving position, and opens the receiving position indicator valve 134 when the shelf 100 is not fully in the receiving position.

The container indicator valve 126 is preferably positioned on the shelf 100 such that the actuator 128 extends slightly above the support surface of the shelf, to provide for engagement with a container transferred onto the shelf 100. The container indicator valve 126 and actuator 128 can sense when the container is fully received on the shelf 100 by positioning the actuator 128 at the rear of the shelf 100, nearest the pivot point. A container will not contact the actuator 128 to position the container indicator valve 126 in the lowering configuration until the container has been fully received on the shelf 100. The container indicator valve 126 thereby can also serve as a container position indicator for delaying the discharge of a container until a container is fully received on the shelf 100. Alternative sensors, including mechanical and electronic sensors, can be provided to prevent the lowering of a shelf 100 unless the container has been properly received.

Referring to FIG. 5, the double acting air cylinder 106 can extend from the vertical support structure 102, 104 to connect to a cross bar 146 extending outwardly from the shelf 100. A support plate 148 can extend from the vertical support structure 102 to provide intermediate cantilever support to the cross bar 146 between the shelf 100 and the air cylinder 106. Thus, the raising and lowering forces generated by the air cylinder 106 are transferred more efficiently to the shelf 100, and the effects of torque on the cross bar 146 are minimized.

In operation, the shelves 100 of the pneumatically controlled shelf assemblies 90, 92, 94 and 96 can be filled with containers 91, 93, 95 and 97 in preparation for automatic dispensing (FIG. 1). The presence of the container 97 on the shelf 100 positions the respective container indicator valve 126 of the shelf assembly 96 to supply a lowering signal to the air line 122. The lowering signal is restricted from advancing to the air cylinder control valve 112 by the dispensing valve 138, which is preferably a normally closed three-way valve. The dispensing valve 138 can operate through a solenoid actuator connected to a remote control, such as a computer 140.

Figure 2:
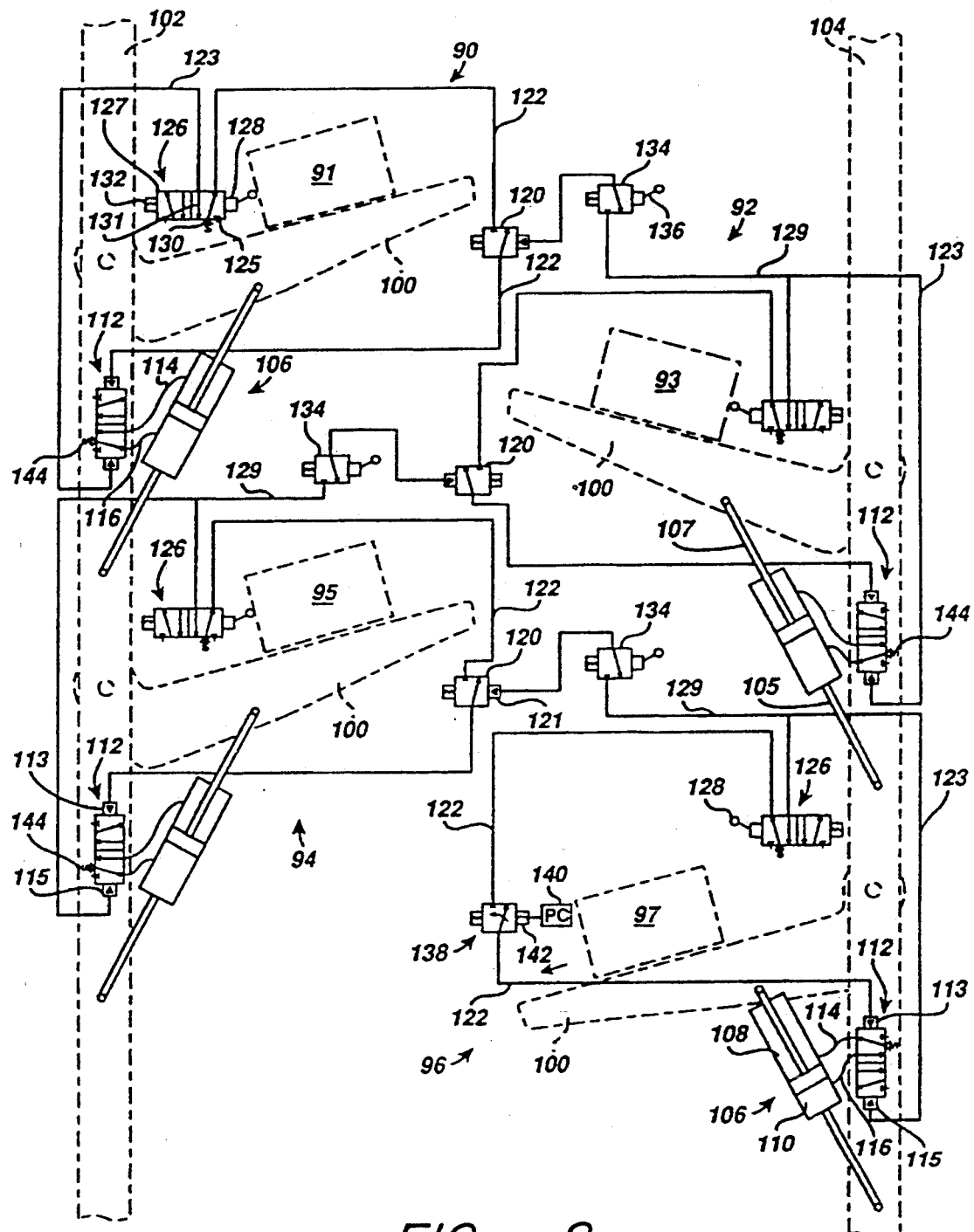
FIG. 2 is a representation similar to FIG. 1, and depicting a second mode of operation.

Actuation of the dispensing valve 138, as signified by the curved arrow 141, opens the dispensing valve 138 and permits passage of the lowering signal through the air line 122 to the cylinder control valve 112. The cylinder control valve 112 is reoriented to the lowering position, whereby supply pressure from a supply 144 is ported to the upper chamber 108 of the air cylinder 106 and air pressure is exhausted from the lower chamber 110. As shown in FIG. 2, this will pivot the shelf 100 to the downwardly tilted discharge position. The container 97 slides off of the shelf 100, and is dispensed from the apparatus.

Figure 3:
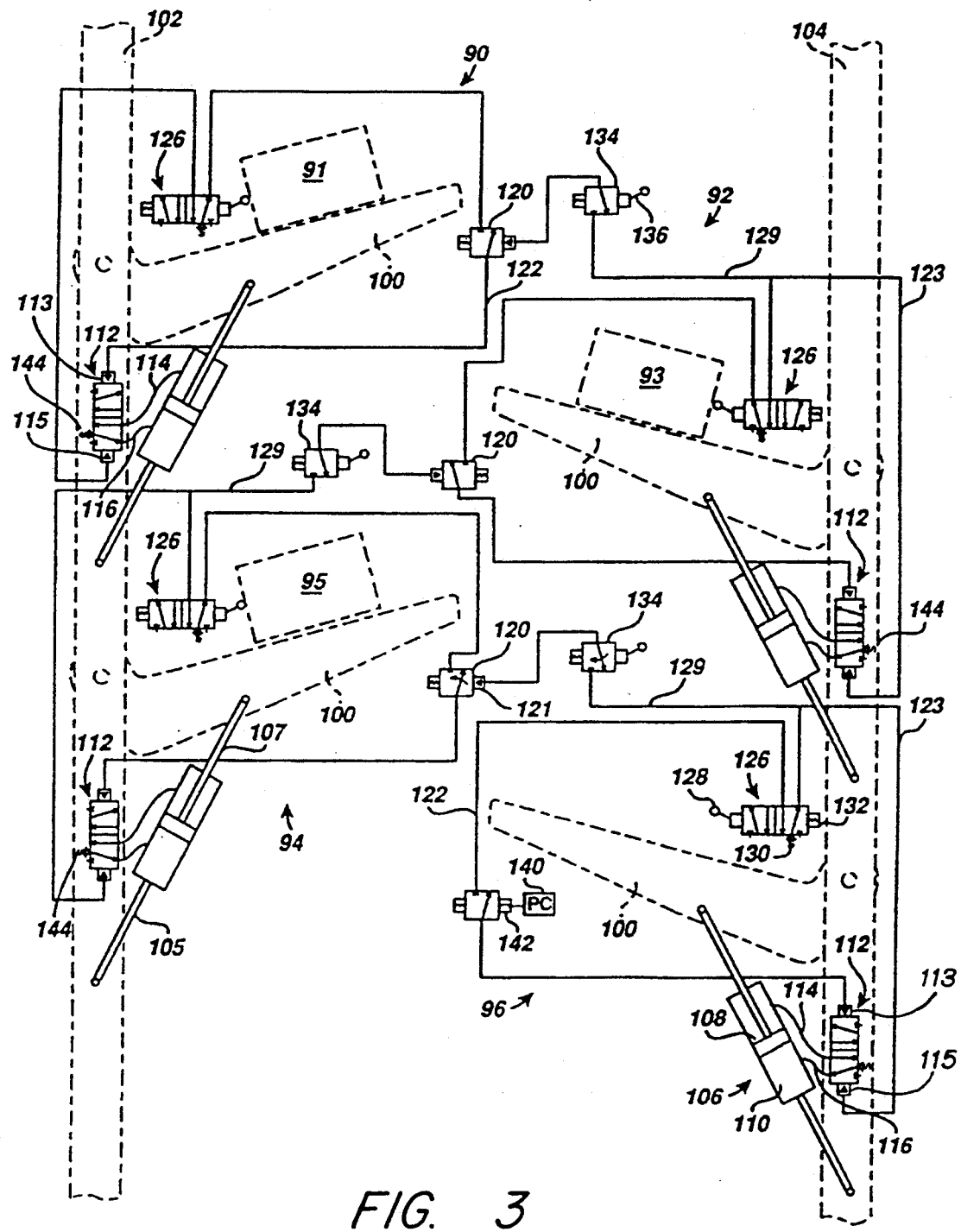
FIG. 3 is a representation similar to FIG. 2, and depicting a third mode of operation.

When the container 97 leaves the shelf 100, the actuator 128 for the container indicator valve 126 is released, permitting the return spring 132 to orient the container indicator valve 126 in the raising configuration, as illustrated in FIG. 3. This configuration of the indicator valve 126 applies pressure from the supply source 130 to the air line 123 and the gate 115, which causes the cylinder control valve 112 to move to the raising configuration. The raising configuration of the cylinder control valve 112 ports supply pressure to the lower chamber 110 of the air cylinder 106 while exhausting pressure from the upper chamber 108, thereby causing the air cylinder 106 to raise the cylinder arm 107 and the shelf 100 to the upwardly tilted receiving position shown in FIG. 3.

The container indicator valve 126, when in the raising configuration, also supplies a transfer request signal through the air line 129 to the receiving position indicator valve 134 of the shelf assembly 96. The pivoting of the shelf assembly 96 to the fully upwardly tilted receiving position causes suitable contact by the shelf 100 with the actuator 136, which opens the receiving position indicator valve 134 to permit passage of the transfer signal to the gate 121 to open the transfer valve 120 of the next higher shelf assembly, here the shelf assembly 94.

The opening of the transfer valve 120 permits passage of a lowering signal from the container indicator valve 126 of the next higher shelf assembly 94 to the gate 113 of the respective air cylinder control valve 112. This will result in lowering of the shelf 100 of the shelf assembly 94 to the downwardly tilted discharge position (FIG. 4). Should the shelf assembly 94 not have a container, the container indicator valve 126 would be oriented to the raising configuration and a signal would be present in the air line 123. The opening of the transfer valve 120 would then be ineffective to lower the shelf 100 until a container is transferred to the shelf assembly 94 to change the configuration of the container indicator valve 126.

When a container leaves the shelf 100 of the shelf assembly 94, the container indicator valve 126 is returned to the raising configuration, thereby signalling the cylinder control valve 112 through the air line 123 to raise the air cylinder 106. A transfer signal is also transferred through the line 129 to the next higher shelf assembly 92, which signal is applied to the gate 121 of the transfer valve 120, to permit the transfer of a lowering signal through the air line 122. This will lower the shelf 100 of the shelf assembly 92, discharging the associated container to the shelf assembly 94. The transfer process described for the shelf assemblies 94 and 96 proceeds up the tower from side to side until all containers have moved to the lower most shelves. Activation of the dispensing valve 138 starts the process again.

The present invention provides storing and dispensing stacks that operate with pivoting shelves, through any number of intermediate positions, when transfer control structure and receiving control structure are used to control, either passively or actively, raising and lowering of shelves. Specific and alternative structure for accomplishing this system of container storage and distribution, in addition to the preferred embodiments set forth above, will be apparent to those skilled in the art. Although particular details of preferred embodiments have been set forth, the scope of the invention is not limited to the details of these preferred embodiments, but rather, only by a reasonable interpretation of the appended claims.

We claim:

1. A vertically accumulating storage and dispensing system for containers and the like, comprising:
    a first plurality of substantially vertically spaced shelf assemblies supported by support structure;
    a second plurality of substantially vertically spaced shelf assemblies supported by support structure and opposing the first plurality of shelf assemblies;
    each of said shelf assemblies comprising:
    a shelf, the shelves being staggered substantially vertically relative to the shelves of the opposing plurality of shelf assemblies, said shelf being mounted to said support structure for pivotal movement at least between an upwardly tilted, receiving position and a downwardly tilted, discharge position;
    fluid-operated structure for moving the shelf between at least the upwardly tilted, receiving position and the downwardly tilted, discharge position;
    control structure for selectively applying fluid pressure to said fluid-operated structure to raise the shelf if the shelf does not have a container or if the next lower shelf assembly is not prepared to receive a container.

2. The system according to claim 1, wherein said control structure includes a container indicator valve adapted to send a raising signal to said fluid-operated structure when said shelf is empty, and a lowering signal when a container is received on said shelf, and a transfer valve adapted to sense the condition of the next lower shelf assembly to prevent lowering of said shelf unless said next lower shelf assembly is prepared to receive a container.

3. The system according to claim 2, wherein said transfer valve is actuated by a fluid signal received from a container indicator valve of the next lower shelf assembly according to whether said next lower shelf assembly has a container.

4. The system according to claim 3, wherein said control structure comprises a control valve adapted to selectively apply raising and lowering fluid pressure to said fluid-operated structure, the position of said control valve being actuated by signals received from said container indicator valve and said transfer control valve.

5. The system according to claim 4, further comprising a receiving position indicator valve, said receiving position indicator valve having structure for sensing whether the next lower shelf assembly is fully in the container-receiving position.

6. The system according to claim 5, wherein said transfer valve is provided in a fluid control line between said container indicator valve and said control valve of the shelf assembly, said transfer valve being affected by a signal from the container indicator valve of the next lower shelf assembly so as to permit a lowering signal from the container indicator valve of the shelf assembly to reach the control valve when said next lower shelf assembly is prepared to receive a container.

7. The system according to claim 6, wherein said receiving position indicator valve is in fluid connection between the transfer control valve of the shelf assembly and the container indicator valve of the next lower shelf assembly, the receiving position indicator valve being actuated by the position of the next lower shelf assembly, and permitting a lowering signal to reach the transfer valve only when the next lower shelf assembly is fully in an upright receiving position.

8. The system according to claim 7, wherein said operated structure is an air cylinder, the control valve is a doubled air pilot, four-way spool valve, said container indicator valve is a mechanically actuated, spring return four-way spool valve, said transfer valve is a normally open, pneumatically actuated three-way valve; and the receiving position indicator valve is a mechanically actuated, normally open three-way valve.

9. The system according to claim 8, wherein the air cylinder is double-acting and spring biased to maintain the shelf in the receiving position in the event of air pressure failure.

* * * * *